(12) United States Patent
England et al.

(10) Patent No.: US 7,477,359 B2
(45) Date of Patent: Jan. 13, 2009

(54) METHOD AND APPARATUS FOR MAKING AND DISPLAYING MEASUREMENTS BASED UPON MULTIPLE 3D RANGEFINDER DATA SETS

(75) Inventors: James N. England, Chapel Hill, NC (US); Aron T. Helser, Chapel Hill, NC (US); Benjamin C. Elgin, Hillsborough, NC (US); Richard L. Holloway, Chapel Hill, NC (US)

(73) Assignee: DeltaSphere, Inc., Chapel Hill, NC (US)

( * ) Notice: Subject to any disclaimer, the term of this patent is extended or adjusted under 35 U.S.C. 154(b) by 197 days.

(21) Appl. No.: 11/351,246

(22) Filed: Feb. 9, 2006

(65) Prior Publication Data

US 2006/0193521 A1 Aug. 31, 2006

Related U.S. Application Data

(60) Provisional application No. 60/652,208, filed on Feb. 11, 2005.

(51) Int. Cl.
*G01C 3/08* (2006.01)
(52) U.S. Cl. .................. 356/4.01; 356/4.1; 356/5.01
(58) Field of Classification Search ....... 356/3.01–3.15, 356/4.01–4.1, 5.01–5.15, 6–22
See application file for complete search history.

(56) References Cited

U.S. PATENT DOCUMENTS

| | | | |
|---|---|---|---|
| 5,309,212 A | 5/1994 | Clark | |
| 5,577,130 A | 11/1996 | Wu | |
| 5,715,166 A | 2/1998 | Besl | |
| 5,734,384 A | 3/1998 | Yanof et al. | |
| 5,878,152 A | 3/1999 | Sussman | |
| 5,988,862 A | 11/1999 | Kacyra | |
| 6,083,162 A | 7/2000 | Vining | |
| 6,246,468 B1 | 6/2001 | Dimsdale | |
| 6,246,898 B1 | 6/2001 | Vesely et al. | |

(Continued)

OTHER PUBLICATIONS

Acuity Research, "AccuRange 4000, Accurange High Speed Interface, Accurange Line Scanner User's Manual", product manual, Dec. 15, 1999, Menlo Park CA.

(Continued)

*Primary Examiner*—Thomas H Tarcza
*Assistant Examiner*—Luke D Ratcliffe
(74) *Attorney, Agent, or Firm*—Jenkins, Wilson, Taylor & Hunt, P.A.

(57) ABSTRACT

A method, computer program product, and apparatus for making and displaying measurements based upon multiple 3D range data sets obtained using a 3D rangefinder device. At least a first and a second 3D range data sets are provided. A 3D transformation is computed therebetween. The first 3D range data set is represented as a first displayed image and the second 3D range data set is represented as a second displayed image. At least two features are identified within the first and second displayed images respectively. A measurement is computed based on at least the first feature and the second feature utilizing the 3D transformation between the first and second 3D range data sets. The computed measurement may be displayed within at least one of the first displayed image and the second displayed image.

24 Claims, 11 Drawing Sheets

(6 of 11 Drawing Sheet(s) Filed in Color)

U.S. PATENT DOCUMENTS

| | | | |
|---|---|---|---|
| 6,346,940 | B1 | 2/2002 | Fukunaga |
| 6,483,950 | B1 | 11/2002 | Wallack |
| 6,590,640 | B1 | 7/2003 | Aiken et al. |
| 6,628,279 | B1 | 9/2003 | Schell et al. |
| 6,704,099 | B2 | 3/2004 | Uomori et al. |
| 6,922,234 | B2 | 7/2005 | Hoffman |
| 6,970,591 | B1 | 11/2005 | Lyons et al. |
| 6,980,690 | B1 | 12/2005 | Taylor et al. |
| 6,992,685 | B2 | 1/2006 | Hallbauer et al. |
| 7,177,486 | B2 | 2/2007 | Stewart et al. |
| 7,206,462 | B1 | 4/2007 | Betke et al. |
| 7,215,430 | B2 * | 5/2007 | Kacyra et al. .............. 356/601 |
| 7,403,268 | B2 | 7/2008 | England et al. |
| 2005/0028111 | A1 | 2/2005 | Schrag et al. |
| 2005/0280714 | A1 | 12/2005 | Freeman |
| 2006/0115133 | A1 | 6/2006 | Potter et al. |
| 2006/0181527 | A1 | 8/2006 | England et al. |
| 2006/0182314 | A1 | 8/2006 | England et al. |
| 2006/0193521 | A1 | 8/2006 | England et al. |
| 2006/0244746 | A1 | 11/2006 | England et al. |
| 2007/0064976 | A1 | 3/2007 | England, III |

OTHER PUBLICATIONS

Acuity Research, "AccuRange 4000 laser rangefinder", product literature, URL http://www.acuityresearch.com/pdf/ar4000-datasheet.pdf, Feb. 10, 2005.

Leica Geosystems, "Leica Cyclone 5.4 Technical Specifications", product literature, URL http://www.leica-geosystems.com/hds/en/Cyclone_5.4_Technical_Specifications.pdf, Mar. 15, 2006.

3RDTECH Inc, "DeltaSphere 3000 Laser 3D Scene Digitizer", product literature, Jun. 22, 2000.

3RDTECH Inc, "Revolutionary 3D Scene Capture, Viewing and Analysis", product literature, URL http://www.deltasphere.com/images/deltaspheredatasheet_112204s.pdf, Nov. 22, 2004.

Nyland et al., "Capturing, Processing and Rendering Real-World Scenes", Videometrics and Optical Methods for 3D Shape Measurement, Electronic Imaging 2001, Photonics West, SPIE vol. 4309 Jan. 22, 2001.

Canesta Inc., "Development Platform DP100", Jun. 26, 2003.

Canesta Inc., "CanestaVision Chips", URL http://www.canesta.com/html/sensors.htm, 2006.

Gokturk et al., "A Time-of-Flight Depth Sensor—System Description, Issues and Solutions" 2004 Conference on Computer Vision and Pattern Recognition Workshop (CVPRW'04) vol. 3.

Tsai, "An Efficient and Accurate Camera Calibration Technique for 3D Machine Vision", Proceedings of IEEE Conference on Computer Vision and Pattern Recognition, Miami Beach, FL, pp. 364-374, 1986.

Turk et al., "Zippered polygon meshes from range images", Computer Graphics, ACM SIGGRAPH 94 Proceedings, Orlando, Fla., pp. 311-318, 1994.

Innovmetric Inc., "PolyWorks Total Point Cloud Inspection and Reverse-Engineering Software Solution", product literature, URL http://www.innovmetric.com/Manufacturing/pdf/brochureWeb.pdf, 2003.

Besl et al., "A Method for Registration of 3-D Shapes", IEEE Transactions on Pattern Analysis and Machine Intelligence, vol. 14 (1992), No. 2, 239-256.

Bernardini et al., "The 3D Model Acquisition Pipeline" vol. 21 (2002), No. 2 pp. 149-172, Computer Graphics forum.

Faugeras et al., "The representation, recognition, and locating of 3-d objects", International Journal of Robotic Research, 5(3):27-52, Fall 1986.

Arun et al., "Least-Squares Fitting of Two 3D Point Sets", in IEEE Transactions on Pattern Analysis and Machine Intelligence, vol. 9 (1987), 698-700.

Acuity Research, "Accurange Line Scanner", product literature, URL http://www.acuityresearch.com/pdf/line-scanner-data-sheet.pdf, Oct. 17, 2005.

3RDTECH Inc., "SceneVision-3D Functions", product literature, URL http://www.deltasphere.com/scenevision_specs.htm, Feb. 28, 2006.

Non-Final Official Action in U.S. Appl. No. 11/523,292 (Jul. 7, 2008).

Non-Final Official Action in U.S. Appl. No. 11/351,234 (Apr. 29, 2008).

Non-Final Official Action in U.S. Appl. No. 11/351,248 (Jan. 23, 2008).

Notification of Transmittal of the International Search Report and the Written Opinion of the International Searching Authority, or the Declaration for International Application No. PCT/US06/36459 (Oct. 23, 2007).

Han et al., "Feature Recognition from CAD Models," IEEE Computer Graphics and Applications, pp. 80-94 (Mar./Apr. 1998).

Jensen et al., "Subpixel Edge Localization and the Interpolation of Still Images," IEEE Transactions on Image Processing, vol. 4, No. 3, pp. 285-295 (Mar. 1995).

* cited by examiner

METHOD AND APPARATUS FOR MAKING AND DISPLAYING MEASUREMENTS BASED UPON MULTIPLE 3D RANGEFINDER DATA SETS

CROSS REFERENCE TO RELATED APPLICATIONS

This patent application claims the benefit of U.S. provisional application Ser. No. 60/652,208 filed Feb. 11, 2005, the entire contents of which are incorporated by reference herein.

FIELD OF THE INVENTION

The present invention relates to 3D rangefinder processing technology generally, and more particularly relates to methods, computer program products, and apparatus for making and displaying measurements based upon at least two 3D rangefinder data sets.

BACKGROUND OF THE INVENTION

A rangefinder is a device for measuring the range from the device to some physical surface. A laser rangefinder can be one of many known types of rangefinders. Laser rangefinders are sometimes known as LIDAR (Light Detection and Ranging) or LADAR (Laser Detection and Ranging) systems. Laser rangefinders use a variety of techniques to measure the range from the apparatus to a surface from which the laser beam is reflected. A typical apparatus may in some manner measure the round trip time-of-flight of the beam from the apparatus's emitter to the target, or the reflector, and back to the apparatus's receiver. One such apparatus is generally commercially available from Acuity Research and known as the AR4000 laser rangefinder, which can be found at URL http://www.acuityresearch.com, for example. Information on example laser rangefinder technology can be found in U.S. Pat. No. 5,309,212 which describes establishing an oscillator whose frequency is dependent on the time-of-flight of the laser beam and then measuring the time period of that oscillator. Since the speed of light is known, this time period measurement can then be readily converted to indicate the range from the apparatus to a surface that reflects the laser beam. A digital interface to a computer is typically included in such rangefinders. Other examples of laser and other rangefinders can be found in the text "Sensors for Mobile Robots: Theory and Application" by H. R. Everett (A. K. Peters, Ltd., 1995).

A rangefinder's laser beam may be directed in various directions by physically pointing the apparatus, by using one or more moving mirrors or prisms under manual or computer control, or both. A common configuration scans the beam in one plane and is called a line scanner, such as that sold commercially by Acuity Research and found at their website, for example. This apparatus includes a laser rangefinder that directs the beam end-on toward a rotating 45-degree mirror. The beam is thus turned at 90 degrees and sweeps out an arc as the 45-degree mirror rotates. The resulting data is a set of range data points representing the profile of an object or space. For example, if the scanned beam is directed at an automobile, a set of data points representing a profile of the automobile is produced.

The rangefinder's laser beam may also be directed to scan in two dimensions by physically pointing the apparatus, by using one or more moving mirrors or prisms, or both. As such the rangefinder's laser beam can thus acquire range measurements to a host of points within the environment. This type of apparatus is sometimes referred to as a scanning 3D laser rangefinder or just scanning laser rangefinder. In general, the three dimensions comprise two dimensions of scanning, such as X and Y, plus range or distance between the rangefinder and a point in space at which the laser beam is directed.

In order to acquire the range measurements to multiple points within an area, the rangefinder beam may be steered under manual or computer control. The steering may be accomplished directly through physical movement or optically through the use of mirrors or prisms. A scanning laser rangefinder sweeps the beam in two directions to cover an area. For example, a scanning laser rangefinder developed by Cyra Technologies Inc. sweeps the beam in an X,Y raster pattern through the use of mirrors. Information on the Cyra rangefinder technology is disclosed in U.S. Pat. No. 5,988,862. As a further example, we discuss the DeltaSphere 3000 laser scanner, such as 100 shown in FIG. 1. As seen, the laser scanner mounts on a tripod 105, includes a laser range finder 140, and is controlled by an embedded computer 150. The laser scanner sweeps the laser beam 110 in elevation using a rotating 45-degree mirror 120 and in azimuth by rotating 130 the laser and mirror assembly. Information on the DeltaSphere 3000 laser scanner product can be found at URL http://www.deltasphere.com. Further background on the technology for the DeltaSphere 3000 laser scanner can be found in "Capturing, Processing and Rendering Real-World Scenes", Videometrics and Optical Methods for 3D Shape Measurement, Electronic Imaging 2001, Photonics West, SPIE Vol. 4309 Jan. 22, 2001, an article by Lars Nyland, Anselmo Lastra, David K. McAllister, Voicu Popescu, and Chris McCue.

Other examples of scanning laser rangefinders can be found in "Sensors for Mobile Robots: Theory and Application" by H. R. Everett (A. K. Peters, Ltd., 1995). The results of these scans are 3D data sets sometimes referred to as "3D point clouds". Similar data is provided by a rangefinder array design, such as those made commercially by Canesta Inc., also known as a range camera, that enables measurement of multiple range points at once. Information may be found at URL http://www.canesta.com/.

Various 3D rangefinder technologies may collect data at various rates ranging from 1 sample per second to several hundred thousand samples per second, but all provide essentially the same results, an array of 3D points where at least the range, elevation, and azimuth for each point is known. This representation in spherical coordinates may easily be transformed to X, Y, Z values in Cartesian coordinates. The rate of collecting the data points determines the time required to capture the data in the field, but obviously has no impact on later processing and use of the data. It will be clear that the methods discussed in this invention are independent of the speed of capture of the original data and that the methods apply to all forms of 3D rangefinder devices.

3D data sets collected by a 3D rangefinder may be presented as a visual display to a user in several different ways. The visualization techniques fall broadly into two classes, 3D displayed images and 2D displayed images.

A 3D displayed image format is one in which the user may select a particular 3D viewpoint and then view the 3D range data as geometric figures in perspective projection or in orthogonal projection or via some other projection within a 2D computer image. Techniques for creating 3D displayed images are well known from computer graphics textbooks such as "Computer Graphics: Principles and Practice in C" by James D. Foley, Andries van Dam, Steven K. Feiner, and John F. Hughes (Addison Wesley 1995). Well-known formats for a 3D displayed image may have the 3D range data samples represented as 3D points (also known as a point cloud) in which the same color is assigned to all points, in which false color is assigned to each point based on its range, in which color is assigned to each point based on its reflectance intensity (strength of the signal returned from a surface to the 3D rangefinder), or in which points are colored via any other scheme. In another well-known 3D display technique, the 3D range data points may be linked together into a 3D mesh using well known computer graphics techniques, such that neighboring points are connected via lines within the display. The lines of the mesh may be colored using any of the techniques discussed above using well-known computer graphics techniques. In another 3D display technique, the 3D range data points may be linked together into a surface using well known computer graphics techniques. The surface may have range values interpolated between actual data points using linear, quadratic, cubic, or any well-known surface interpolation technique. The color of the surface at each displayed pixel may be determined in any of a number of well-known ways, including computing simulated lighting effects based on the orientation of the interpolated surface, interpolating reflectance intensity values measured at each data point, mapping a 2D image or any other function to the 3D surface using well-known texture-mapping techniques, combinations thereof, or any using other well-known techniques for surface rendering.

A 2D displayed image is one in which the 3D range data set is inherently represented as a 2D image. There are several well-known techniques for creating 2D displayed images since the data from a typical 3D rangefinder is obtained by scanning in two dimensions, typically azimuth and elevation. The resulting data can naturally be represented as a 2D image in spherical projection, where the azimuth angle of a 3D sample is represented as the horizontal or X axis and the elevation angle is represented as vertical or Y axis on the display, and each pixel represents one or more 3D data points depending on the scale chosen. Of course, the 2D displayed image need not be represented in spherical projection, but in any other well-known projection of a 3D data set to a 2D display. As illustrated in FIG. 2, for example, each pixel may have a multiplicity of associated values stored with it, including precise azimuth angle value 210, precise elevation angle value 220, range value 230, reflectance value 240, color 250 (RGB), and any other useful values 260. For example, a useful value might be some other attribute associated with the pixel. The color of each pixel within the 2D displayed image may be determined in any of a number of well-known formats. A Range Image has a false color assigned to each pixel based on its range. A Reflectance Image has a color assigned to each pixel based on the intensity of the reflected laser beam. A Registered Color Image has a color assigned to each pixel based on the color obtained from a color sensor such as a 2D digital camera such that the range data and color data are aligned as shown in FIG. 3. A Registered Color Image may typically be created by the steps of capturing a 3D range data set with a 3D rangefinder and displaying it as a Reflectance Image 310, capturing a 2D image using a calibrated digital color camera and displaying it as a 2D color image 320, identifying corresponding features between the two 2D images such as 311 and 321, 312 and 322, 313 and 323, and 314 and 324, using the locations of the corresponding features to compute the pose (location and orientation) of the 2D digital color camera, using the camera pose information to compute the optical path from the camera into the 3D data set, and applying the color from each pixel of the 2D color image to corresponding points of the 3D data set displayed as a 2D image. Using this method, the 3D range data and 2D color image need not have been acquired from the same viewpoint. Further information on the mathematics underlying the 2D image registration process may be found in an article by R. Y. Tsai, "An Efficient and Accurate Camera Calibration Technique for 3D Machine Vision", Proceedings of IEEE Conference on Computer Vision and Pattern Recognition, Miami Beach, Fla., pp. 364-374, 1986.

Examples of a Range Image, a Reflectance Image, and a Registered Color Image may be found in an article by Lars Nyland, Anselmo Lastra, David K. McAllister, Voicu Popescu, and Chris McCue, titled "Capturing, Processing and Rendering Real-World Scenes", Videometrics and Optical Methods for 3D Shape Measurement, Electronic Imaging 2001, Photonics West, SPIE Vol. 4309 Jan. 22, 2001. The ability to create and display a Range Image, a Reflectance Image, and a Registered Color Image has been available in the DsControl, DsColor, and other software provided to DeltaSphere 3000 customers beginning some time ago.

When the 3D data set is displayed in any of the above formats, it is a well-known technique for a user to interactively select a particular pixel on the screen and to determine the X, Y, Z coordinates of the data represented at that pixel. In 2D displayed images, for example, the ability to select and display the X, Y, Z coordinates for any point in a Range Image, a Reflectance Image, and a Registered Color Image has been available in the DsControl and other software provided to DeltaSphere 3000 customers beginning some time ago. For 3D displayed images, commonly used computer graphics and computer-aided design software packages have enabled a user to pick a point, a point on a mesh, or a point on a surface and determine the X, Y, Z coordinates of that point. As another example, U.S. Pat. No. 6,922,234 discloses methods of making measurements within a reflectance image obtained from a laser scanner which captures data at up to 125,000 points per second.

It is necessary at times to combine multiple laser rangefinder 3D range data sets. It is common practice using well-known techniques to cover a large area or object with multiple scans taken from different viewpoints and to then "stitch" or integrate these scans together into a single 3D model. This process is known as registration. One such method for registering 3D range sets together is disclosed in G. Turk and M. Levoy, "Zippered polygon meshes from range images", Computer Graphics, ACM Siggraph 94 Proc, Orlando, Fla., pp. 311-318, 1994.

Using registration, the geometric correspondence between the distinct 3D range data sets can be determined. As is well known from elementary computer graphics texts such as "Computer Graphics: Principles and Practice in C" by James D. Foley, Andries van Dam, Steven K. Feiner, and John F. Hughes (Addison Wesley 1995), a point in one 3D frame of reference can be transformed into the coordinates of a second frame of reference using a 3D rigid transformation comprising three rotation angles plus a 3D translation. The critical component of registration is the 3D transformation defining how to convert the 3D data points in one scan or 3D range data set into the 3D coordinate space of another 3D range data set. Also it may be desired to convert the 3D data points in one scan or 3D range data set into a separate common 3D coordinate space.

For example, suppose a 3D rangefinder is used to acquire a first 3D data set of a vehicle from a left front viewpoint and is then moved to acquire a second 3D data set from a left side viewpoint. If the 3D transformation between the two viewpoints is known, then both sets of 3D data may be easily combined into a single coordinate space and display and measurement using both data sets is facilitated.

Additional scans or 3D range data sets may then be added serially in like fashion, all to a common frame of reference. As such, the geometric correspondence between two or more 3D range data sets may be established. This is also known as registering two or more 3D range data sets. In the case of the vehicle example, 3D data sets might be acquired from the left front, left side, left rear, right rear, right side, and right front viewpoints and then all of these 3D data sets would be registered in order to create a single complete 3D model of the vehicle. Several existing software packages provide this capability—for example the PolyWorks software package from Innovmetric, such as described on the internet at URL http://www.innovmetric.com/ includes a software tool called ImAlign.

In the Polyworks software package and others for example, the user is allowed to specify multiple pairs of corresponding points from two 3D range data sets and to either use those correspondences directly or as a starting point for an algorithm that refines the geometric correspondence such as that disclosed in P. J. Besl and N. D. McKay, "A Method for Registration of 3-D Shapes", IEEE Transactions on Pattern Analysis and Machine Intelligence, Vol. 14 (1992), No. 2, 239-256. Well-known mathematical techniques allow the calculation of the necessary scan-to-scan 3D transformation from multiple pairs of points. By simple linear algebra, three corresponding pairs of points are the minimum necessary to solve for the desired transformation matrix. Likewise, well known methods allow the transformation matrix to be solved by finding three corresponding planes. Additional references on registration techniques may be found in Fausto Bernardini and Holly Rushmeier, "The 3D Model Acquisition Pipeline" Volume 21 (2002), number 2 pp. 149-172 COMPUTER GRAPHICS forum.

In conventional methods, multiple 3D data sets are then merged together into one new 3D data file using the 3D transformation obtained from the registration process, and the results displayed as a 3D point display. The user may then typically select points of interest within the combined 3D data set and make measurements, such as distance from one point to another, or perpendicular distance from one surface to another, or area of a surface, or volume bounded by a set of surfaces. In conventional methods, the merger of multiple 3D data sets into a single 3D display with many thousands or millions of data points may create a very complicated and often confusing display to a user. This may make it difficult for a user to identify and specify the correct features of interest for measurement. It would be advantageous to have additional methods for making and displaying measurements in ways that a user might find more natural or easier to understand. As such, user productivity would be increased, and new applications for 3D rangefinder technology could be enabled.

SUMMARY OF THE INVENTION

The present invention and its various embodiments seek to address at least some of the above needs and problems while attempting to deliver one or more of the above advantages. Further, the present invention provides a number of embodiments that seek to allow a user to more effectively make and display measurements based upon at least two 3D range data sets. As such, the user can more productively interact with 3D range data sets to allow applications to be better served. The present invention provides methods, computer program products, and apparatuses for making and displaying measurements based upon at least two 3D range data sets in various embodiments.

In a first embodiment, the present invention provides a method for making measurements between two 3D range data sets obtained using a 3D rangefinder device. The method comprises the steps of providing a first 3D range data set and providing a second 3D range data set. A 3D transformation between the first 3D range data set and the second 3D range data sets is computed. Further, the first 3D range data set is represented as a first displayed image. At least a first feature is identified within the first displayed image, while at least a second feature is identified within the second displayed image. Next, the method includes the step of computing a measurement based on at least the first feature and the second feature utilizing the 3D transformation between the first 3D range set and the second 3D range data set. Thereafter, the computed measurement may be displayed within at least one of the first displayed image and the second displayed image. Various other embodiments related to the preceding embodiment are provided.

A second embodiment of the invention provides a computer program product stored in computer readable media for execution in at least one processor. The computer program product may be used for making measurements between two 3D range data sets obtained using a 3D rangefinder device. A number of software modules comprise this embodiment. A first software module for providing a first 3D range data set and a second software module for providing a second 3D range data set are both included. Further, the embodiment provides a third software module for computing a 3D transformation between the first 3D range data set and the second 3D range data sets. Fourth and fifth software modules are included to represent the first 3D range data set as a first displayed image and to represent the second 3D range data set as a second displayed image respectively. A sixth software module for identifying at least a first feature within the first displayed image is provided. Similarly, the embodiment includes a seventh software module for identifying at least a second feature within the second displayed image. The embodiment provides an eighth software module for computing a measurement based on at least the first feature and the second feature utilizing the 3D transformation between the first 3D range set and the second 3D range data set. In addition, a ninth software module for displaying the computed measurement within at least one of the first displayed image and the second displayed image is provided. Yet other embodiments related to the preceding computer program product embodiment are also provided.

A third embodiment of the present invention comprises an apparatus for making measurements between two 3D range data sets obtained using a 3D rangefinder device. The apparatus includes at least one computer processor therein, and a computer program product executing within the at least one computer processor. Thus, a first software module is included for providing a first 3D range data set and a second software module for providing a second 3D range data set. In addition, the embodiment provides a third software module for computing a 3D transformation between the first 3D range data set and the second 3D range data sets. Fourth and fifth software modules are included to represent the first 3D range data set as a first displayed image and to represent the second 3D range data set as a second displayed image respectively. A sixth software module for identifying at least a first feature within the first displayed image is provided. Similarly, the embodiment includes a seventh software module for identifying at least a second feature within the second displayed image. The embodiment further provides an eighth software module for computing a measurement based on at least the first feature and the second feature utilizing the 3D transformation between the first 3D range set and the second 3D range data set. A ninth software module for displaying the computed measurement within at least one of the first displayed image and the second displayed image is included. Further embodiments related to the apparatus embodiment are provided by the present invention.

BRIEF DESCRIPTION OF THE FIGURES

The patent or application file contains at least one drawing executed in color. Copies of this patent or patent application publication with color drawing(s) will be provided by the Office upon request and payment of the necessary fee.

DETAILED DESCRIPTION OF THE INVENTION

Figure 1:
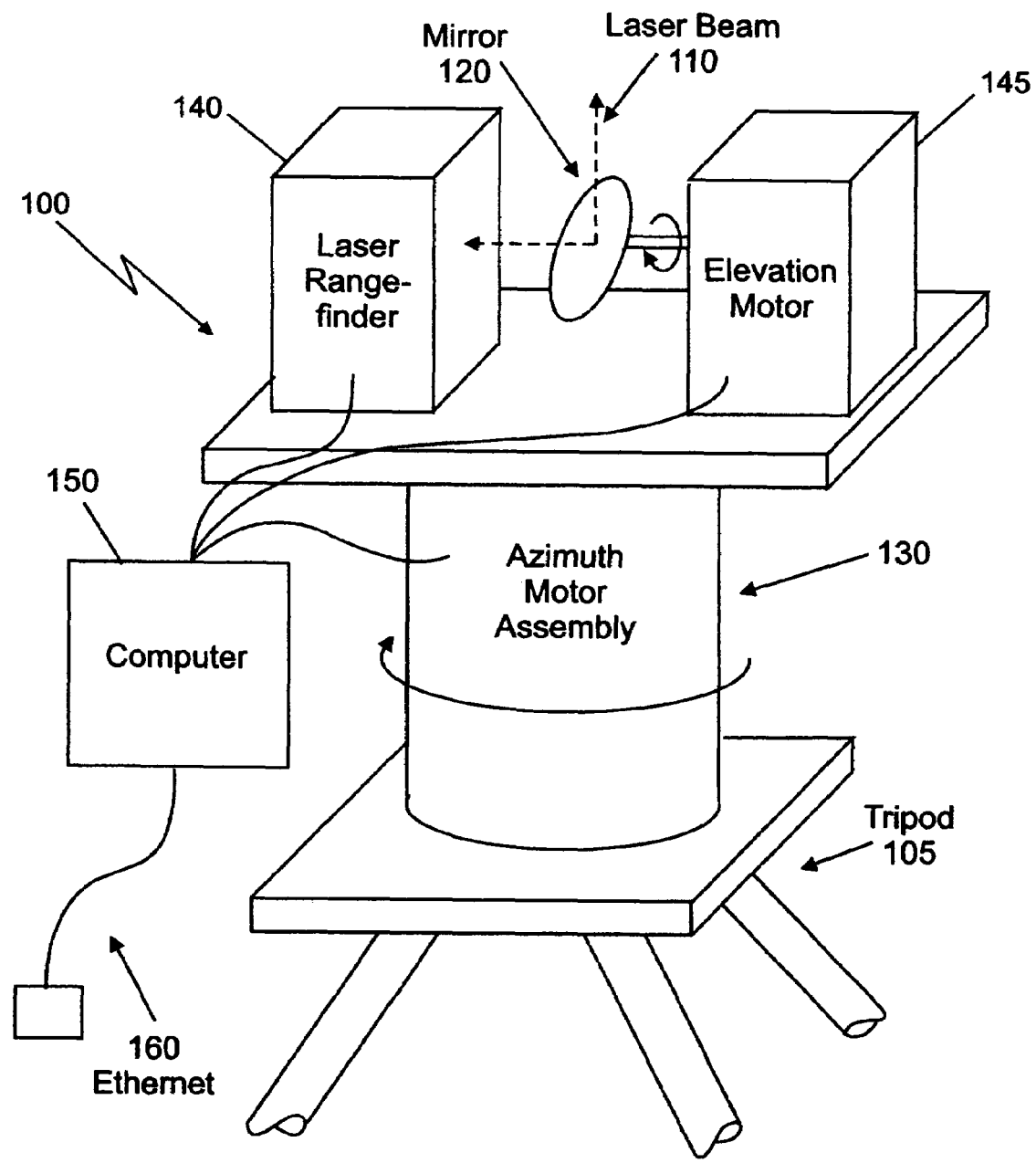
FIG. 1 is a diagram illustrating a conventional 3D scanning laser range finder.

The present invention now will be described more fully hereinafter with reference to the accompanying illustrative figures, in which various embodiments of the invention are shown. This invention may, however, be embodied in many different forms and should not be construed as limited to the embodiments set forth herein. Rather, these embodiments are provided so that this disclosure of the present invention will be thorough and complete, and will fully teach and describe the invention to those skilled in the art. Although specific terms are employed herein, they are used in a generic and descriptive sense only and not for purposes of limiting the scope of the present invention as defined by the attached claims in any way. Some terminology may be defined herein and used to describe forthcoming embodiments of the present invention, in order to teach the present invention to those skilled in the art. Terms not described explicitly in this disclosure should be construed as they would by those skilled in the art. Unless otherwise expressly limited, all terms used herein including technical and scientific terms, whether defined herein or not, are intended to have the broadest possible meaning as understood by one of ordinary skill in the art. It will be further understood that terms not explicitly defined herein should be interpreted as having the broadest possible meaning or meanings found in commonly used dictionaries, consistent with their meaning in the context of the relevant art. Some terms will be explicitly defined herein and used to describe embodiments of the present invention to those skilled in the art. Terms defined explicitly herein should be interpreted as the broader of their definition herein and their dictionary meanings. These defined terms should accordingly be construed according to their broadest possible meaning to skilled artisans in this field.

The Figures are provided for illustrative purposes for teaching purposes and to assist in understanding the present invention, and should not be viewed as precision blueprints or perfectly scaled drawings. In the drawings provided, the dimensions of features or regions may be exaggerated for clarity, readability, or the like. Features in the Figures may not be exactly to scale. The Figures are provided to show example embodiments of the present invention. Thus, embodiments of the present invention should not be construed as limited solely to the particular Figure or Figures illustrated herein but may include variations and deviations from many sources. Like numbers refer to like features or elements throughout. As used herein the term "and/or" includes any and all combinations of one or more of the associated listed items. Further, as used herein the term "at least" includes the number specified plus more than the number specified, unless explicitly limited otherwise.

As used herein, the singular forms "a", "an" and "the" are intended to include the plural forms as well, unless the context clearly indicates otherwise. It will be further understood that the terms "comprises" or "comprising," when used in this specification, specify the presence of stated features, steps, operations, elements, and/or components, but do not preclude the presence of one or more additional features, steps, operations, elements, components, and/or combinations thereof. Moreover, terms such as "horizontal", "vertical" and "perpendicular" indicate general directions or relationships rather than precise 0° or 90° orientations. Ranges and angles are approximate and are provided merely to teach the invention.

In one embodiment, the present invention provides a method for making measurements between two 3D range data sets obtained using a 3D rangefinder device. The method comprises the steps of providing a first 3D range data set and providing a second 3D range data set. A 3D transformation between the first 3D range data set and the second 3D range data sets is computed. Further, the first 3D range data set is represented as a first displayed image. At least a first feature is identified within the first displayed image, while at least a second feature is identified within the second displayed image. Next, the method includes the step of computing a measurement based on at least the first feature and the second feature utilizing the 3D transformation between the first 3D range set and the second 3D range data set. Thereafter, the computed measurement may be displayed within at least one of the first displayed image and the second displayed image. Various other embodiments related to the preceding embodiment are provided.

In embodiments, the computed measurements may be displayed in the first displayed image only, in the second displayed image only, or in both the first displayed image and the second displayed image in combination. Further, displaying the computed measurement may represent a number of displays. For instance, the computed measurement may be displayed as a measurement point display, a plurality of measurement points displayed, a measurement line display, a plurality of measurement lines displayed, a measurement surface displayed, a plurality of measurement surfaces displayed, or the like. In addition, the computer display may be a value displayed, a plurality of values displayed, a measurement volume displayed, a plurality of measurement volumes displayed, a measurement feature displayed, and a plurality of measurement features displayed. Of course, the computed measurement may also be represented as combinations of the preceding displays. Some embodiments further include at least a third display. In these cases, the computed measurement may be displayed in at least the third displayed image, displayed in the first displayed image, displayed in the second displayed image, and displayed in some combination of the preceding displayed images.

The second 3D range data set may be obtained in many ways. A second 3D range data set can be obtained by the same 3D rangefinder device as the first 3D range data set but obtained from a different 3D location than the first 3D range data set. In addition, the second 3D range data set may be obtained by the same 3D rangefinder device as the first 3D range data set from the same 3D location but obtained at a different resolution than the first 3D range data set. The second 3D range data set can be obtained by the same 3D rangefinder device as the first 3D range data set from the same 3D location but obtained at a different time than the first 3D range data set. Also, the second 3D range data set can be being obtained by using a different 3D rangefinder device than was used for the first 3D range data set and obtained at the same 3D location as the first 3D range data set. Further, the second 3D range data set may be obtained by using a different 3D rangefinder device than was used for the first 3D range data set and obtained from a different 3D location. In addition, a second 3D range data set could be obtained by a different 3D rangefinder device than was used for the first 3D range data set and obtained at a different time. Range data sets, such as the first 3D range data set, second 3D range data set, or the like, can be provided from various sources. For instance, a scanning laser rangefinder using time of flight range measurement principles, a scanning laser rangefinder using phase comparison range measurement principles, or a scanning laser rangefinder using any other range measurement principles could be used to provide 3D range data sets. An imaging laser rangefinder range camera using time of flight range measurement principles, an imaging laser rangefinder range camera using phase comparison range measurement principles, or an imaging laser rangefinder range camera using any other range measurement principles might provide 3D range data sets. In addition, a triangulation rangefinder, a stereo image rangefinder, a multiple image rangefinder, any other device that acquires a multiplicity of range data points simultaneously may be used. Also, any other device that acquires a multiplicity of range data points over a period of time, or combinations of the above could be used to provide 3D range data sets.

The first displayed image, the second displayed image, or both, could comprise a 2D image. A 2D image might comprise range values from the 3D rangefinder device converted to monochrome, or a 2D range image comprising range values from the 3D rangefinder device converted to false color. Further, a 2D image could be a 2D reflectance image comprising intensity values of the rangefinding signal reflected from a physical surface and thereafter received by the 3D rangefinder device converted to monochrome, or a 2D reflectance image comprising intensity values of the rangefinding signal reflected from a physical surface and thereafter received by the 3D rangefinder device converted to false color. In addition, a 2D image may be registered. For example, it may be a 2D registered color image comprising a color camera image previously registered with 3D range data, a 2D registered color image wherein the image is acquired from the same perspective as the 3D range data set, a 2D registered color image wherein the image is acquired from a different perspective than the 3D range data set, a 2D registered color image wherein the image is acquired with the same resolution as the 3D range data set, or a 2D registered color image wherein the image is acquired with different resolution from the 3D range data set. Also, a 2D image can be a 2D image displayed in spherical projection format, a 2D image displayed in any other 3D-to-2D projection format, a 2D registered monochrome image comprising a monochrome camera image previously registered with 3D range data, or the like. Combinations of the above are also possible.

Further, the first displayed image, the second displayed image, or both, could comprise a 3D image. A 3D image might comprise a 3D point display, a 3D point display in orthogonal projection, or a 3D point display in perspective projection. In addition, a 3D polygonal mesh display, a 3D polygonal mesh in orthogonal projection display, or a 3D polygonal mesh in perspective projection display may comprise the 3D image. The 3D image could be a 3D surface geometry display, a 3D surface geometry display in orthogonal projection, or a 3D surface geometry display in perspective projection.

For some embodiments, one or more 3D range data sets could each be represented by at least two images. In other embodiments, at least three range data sets are provided, such that the respective features can be identified within the respective displayed images. In addition, the measurement can be computed by computing the measurement between at least two 3D range data sets in parallel. The measurement could be computed by computing the measurement between at least two 3D range data sets simultaneously. Further, a measurement might be computed by computing the measurement between at least two 3D range data sets serially. Of course, combinations of the preceding could be used to compute a measurement in embodiments.

Those skilled in the art will appreciate that the method embodiments can be implemented in any number of ways. The method could be implemented in a computer processor executing a suitable computer software program product therein. Further, the method may be implemented in a suitable computer software program product embodied on computer readable tangible media.

In some embodiments, identifying the first feature, the second feature, or both could use various facilities. For example, a feature could be identified by using a computer cursor controlled by a mouse to identify, by using a computer cursor controlled by a pointing stick to identify, or by using a computer cursor controlled by a joystick to identify. In addition, a feature could be identified by using a computer cursor controlled by a touch pad to identify, using software to identify, or combinations of the facilities above allowing a user to identify features. For embodiments, at least part of identifying features could be done automatically. For example, orienting a measurement perpendicularly from a specified surface, placing a feature restricted to a specified surface, or placing a feature in the center of a circular feature could be done automatically, at least in part. In addition, combinations of the above could be used.

A number of techniques could be used to specify corresponding features in embodiments. Sub-pixel interpolation can be used in any displayed image wherein a software tool may allow the user to estimate and specify the location of a feature anywhere within a pixel and not just at its origin. Interpolation may be used between measured 3D range data points on surfaces in any 3D displayed image, wherein a software tool may allow the user to estimate and specify the location of a feature anywhere upon a surface even if that particular location is not directly associated with a measured 3D range data point. Estimates of the centers of features can be used such that user may estimate and specify the location of the center of a feature even if the particular pixel at that chosen center appears no different from adjacent pixels. Also, holes and data interpolated across holes can be used, wherein the range finder device did not acquire a range measurement and wherein a software tool may allow the user to estimate and specify the location of a feature anywhere within a hole even though that particular location is not directly associated with a measured 3D range data point. Of course, combinations of the above and other techniques are possible.

The present invention provides other embodiments. For instance, one embodiment of the invention provides a computer program product stored in computer readable media for execution in at least one processor for making measurements between two 3D range data sets obtained using a 3D range finder device. A number of software modules comprise this embodiment. A first software module for providing a first 3D range data set and a second software module for providing a second 3D range data set are both included. Further, the embodiment provides a third software module for computing a 3D transformation between the first 3D range data set and the second 3D range data sets. Fourth and fifth software modules are included to represent the first 3D range data set as a first displayed image and to represent the second 3D range data set as a second displayed image respectively. A sixth software module for identifying at least a first feature within the first displayed image is provided. Similarly, the embodiment includes a seventh software module for identifying at least a second feature within the second displayed image. The embodiment provides an eighth software module for computing a measurement based on at least the first feature and the second feature utilizing the 3D transformation between the first 3D range set and the second 3D range data set. In addition, a ninth software module for displaying the computed measurement within at least one of the first displayed image and the second displayed image is provided. The present invention also provides other embodiments related to the preceding, and the prior discussion related to the method embodiments applies also to the computer program product embodiments.

The present invention provides an apparatus in yet another embodiment. The apparatus may be used for making measurements between two 3D range data sets obtained using a 3D rangefinder device. The apparatus includes at least one computer processor therein, and a computer program product executing within the at least one computer processor. Thus, a first software module is included for providing a first 3D range data set and a second software module for providing a second 3D range data set. In addition, the embodiment provides a third software module for computing a 3D transformation between the first 3D range data set and the second 3D range data sets. Fourth and fifth software modules are included to represent the first 3D range data set as a first displayed image and to represent the second 3D range data set as a second displayed image respectively. A sixth software module for identifying at least a first feature within the first displayed image is provided. Similarly, the embodiment includes a seventh software module for identifying at least a second feature within the second displayed image. The embodiment further provides an eighth software module for computing a measurement based on at least the first feature and the second feature utilizing the 3D transformation between the first 3D range set and the second 3D range data set. A ninth software module for displaying the computed measurement within at least one of the first displayed image and the second displayed image is included. The present invention also provides other embodiments related to the preceding. Further, the prior discussion related to the method embodiments applies also to the apparatus embodiments. Next we discuss more details regarding various embodiments of the present invention.

Figure 4:
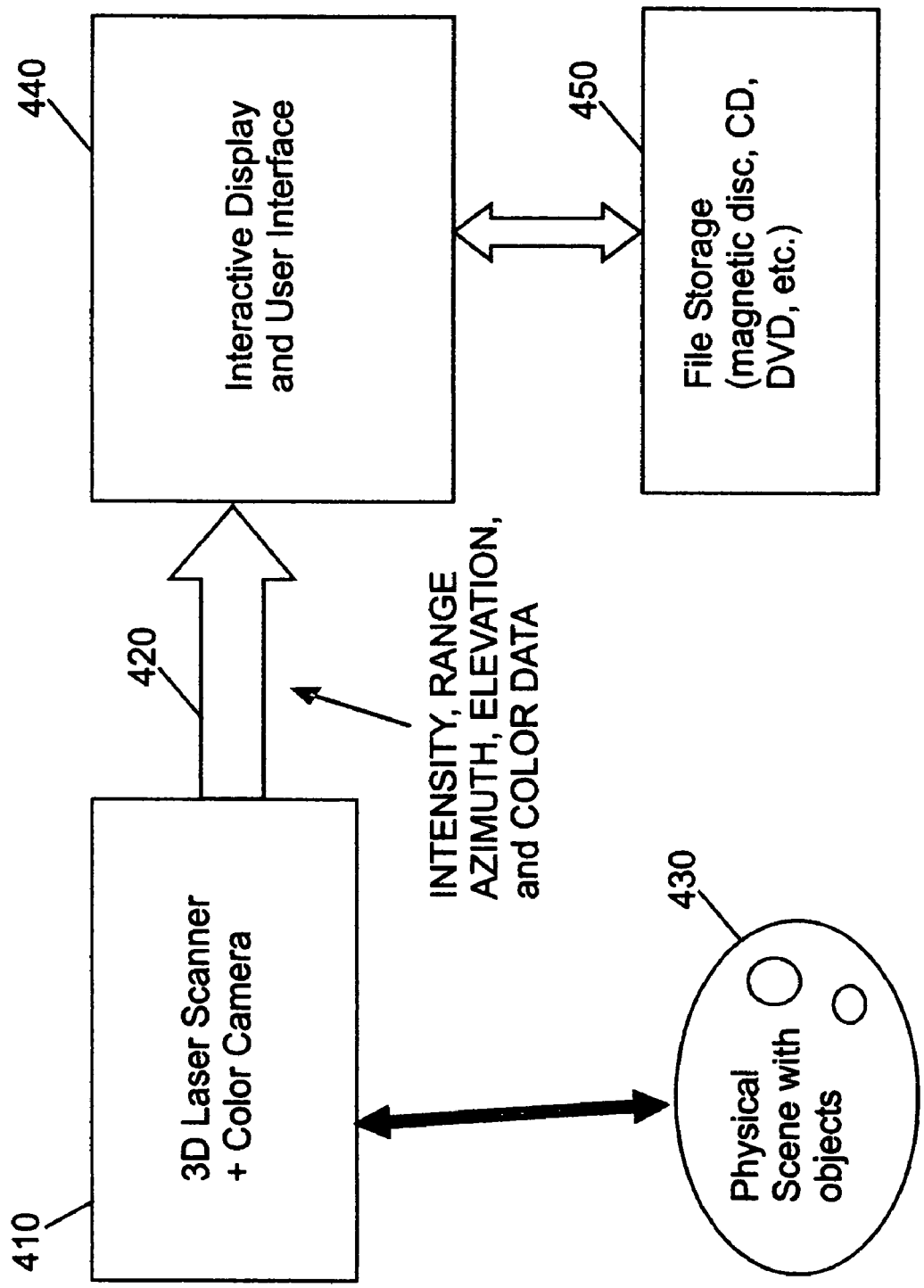
FIG. 4 is a diagram illustrating one example of the acquisition of a 3D range data set.

Referring to FIG. 4, a 3D rangefinder 410 is used to acquire a 3D range data set 420 from a physical object or scene 430. One 3D rangefinder 410 embodiment shown in FIG. 1 is a laser scanning 3D rangefinder 100 comprising a time-of-flight laser rangefinder 140, elevation scanning mirror 120 which is rotated by elevation motor 145, and azimuth rotating motor assembly 130. The 3D rangefinder such as shown in FIG. 1 also includes an embedded computer 150 for interfacing to and controlling the rangefinder 140, elevation motor 145, and azimuth motor 130. The embedded computer 150 communicates with any external computer via Ethernet 160 and also transfers data samples from the rangefinder, performs necessary data processing such as applying calibration tables, and passes data samples to the external computer for visualization, storage, and subsequent processing.

We see that in FIG. 4, the 3D range data set 420 for each data sample comprising intensity, range, azimuth, and elevation values is transferred to an external computer and presented in a computer display 440 for evaluation and control of laser scanning parameters such as resolution and speed. The data is simultaneously stored in a computer file 450 for later processing and display.

Two or more 3D range data sets such as 450 are typically acquired using the laser scanning 3D rangefinder 410 located at different locations around the scene. Other techniques for acquiring multiple 3D data sets 450 may be used including using the same rangefinder 410 at different times or at different resolutions and using two or more different 3D rangefinders 410. The operator or user must take care that there is some area of the scene that is overlapped by two or more acquisition scans so that a subsequent registration step may be readily performed.

After acquisition of the 3D range data sets 450 from a physical scene such as 430 with objects, the next step is registering the multiple data sets. Typically, each data set to be registered is presented to a user via a computer display as a 3D set of points and the user then performs the step of identifying corresponding features within the 3D images representing the multiple data sets.

For example, the user might use a mouse or other control device to position a cursor such as a crosshairs over a desired pixel within a 3D displayed image. The corresponding X, Y, and Z values for that pixel are known, having been used to create the displayed pixel using well-known 3D computer graphics techniques. The user next proceeds to select as many pairs of features as desired as input to the next step of calculating the 3D transformation between two range data sets.

A minimum of three non-collinear pairs of corresponding 3D (X, Y, Z) points is needed to calculate the desired 3D rigid transformation using well-known techniques to solve for 3 rotation angles plus 3 translations, including those disclosed for example in O. D. Faugeras and M. Hebert "The representation, recognition, and locating of 3-d objects", International Journal of Robotic Research, 5(3):27-52, Fall 1986. More points may be used along with well-known least-squares minimization techniques to obtain a better fit, as disclosed for example in K. Arun, T. Huang, and S. Blostein, "Least-Squares Fitting of Two 3D Point Sets", in IEEE Transactions on Pattern Analysis and Machine Intelligence, vol. 9 (1987), 698-700. Also the initial sets of corresponding features may be used as the starting points for algorithms such as the iterated closest point technique disclosed in P. J. Besl and N. D. McKay, "A Method for Registration of 3-D Shapes", IEEE Transactions on Pattern Analysis and Machine Intelligence, Vol. 14 (1992), No. 2, 239-256. Additional references to registration techniques which might be used are given in Fausto Bernardini and Holly Rushmeier, "The 3D Model Acquisition Pipeline" Volume 21 (2002), number 2 pp. 149-172 COMPUTER GRAPHICS forum.

Having accomplished the step of registering two or more 3D data sets by computing the 3D transformation between them, the user is now ready to make and display measurements between the 3D data sets. Unlike conventional techniques which require the user to merge all the 3D data sets into one combined 3D data set and to display that combined 3D data set, the new invention enables the user to work with more natural and easy-to-understand display formats for specification and display of measurements.

Figure 5:
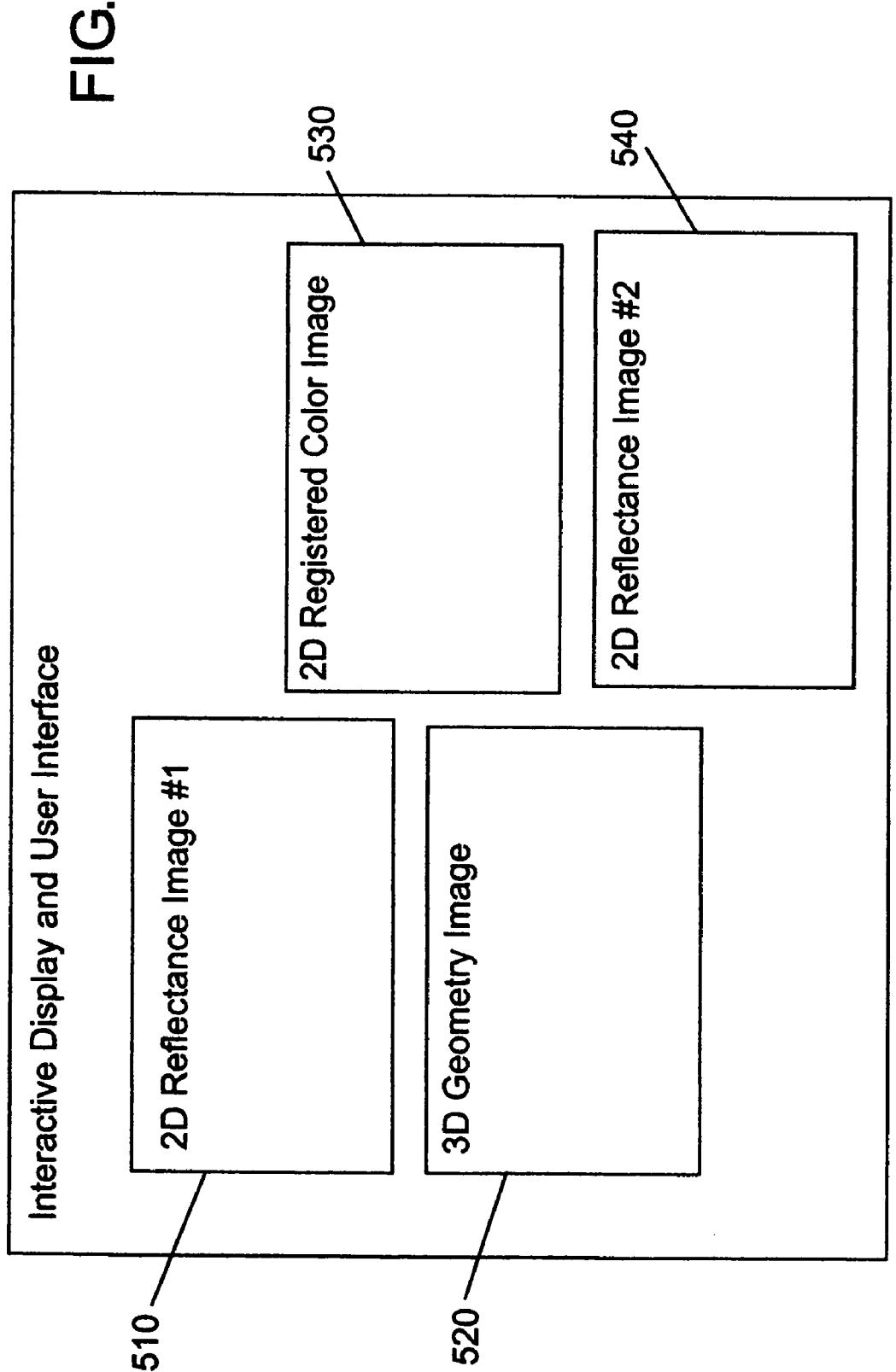
FIG. 5 is a diagram illustrating an example display of multiple images representing two 3D range data sets, according to some embodiments of the present invention.

First each data set to be used for measurement is presented to a user via a computer display. The user may select from multiple formats which may be used for displaying this data as shown in FIG. 5. As an example, data from the first 3D data set is represented in window 510, representing a 2D Reflectance Image for example, and window 520, representing a 3D geometric image on the display screen while data from the second 3D data set is represented in windows 530 and 540 on the display screen. Window 540 may represent 2D Reflectance Image #2, and window 530 can represent a 2D Registered Color Image, for example.

A 3D displayed image format such as 520 is one in which the user may select a particular 3D viewpoint and then view the 3D range data as geometric figures in perspective projection or in orthogonal projection or via some other projection. Techniques for displaying collections of 3D data are well known from computer graphics textbooks such as "Computer Graphics: Principles and Practice in C" by James D. Foley, Andries van Dam, Steven K. Feiner, and John F. Hughes (Addison Wesley 1995). The display may represent range data samples as 3D points (also known as a point cloud) which may all be colored a single color, which may have false color assigned to each point based on its range, which may have color assigned to each point based on the intensity of the reflected laser beam, or colored via any other scheme. In another 3D display technique, the 3D range data points may be linked together into a displayed mesh using well known computer graphics techniques, such that neighboring points are connected via lines within the display. The lines of the mesh may be colored using any of the techniques discussed above using well-known computer graphics techniques. In another 3D display technique, the 3D range data points may be linked together into a surface using well known computer graphics techniques. The surface may have range values interpolated between actual data points using linear, quadratic, cubic, or any well-known surface interpolation technique. The color of the surface at each displayed pixel may be determined in any of a number of well-known ways, including computing simulated lighting effects based on the orientation of the interpolated surface, interpolating reflectance intensity values measured at each data point, mapping a 2D image or any other function to the 3D surface using well-known texture-mapping techniques, combinations thereof, or any using other well-known techniques for surface rendering.

Figure 2:
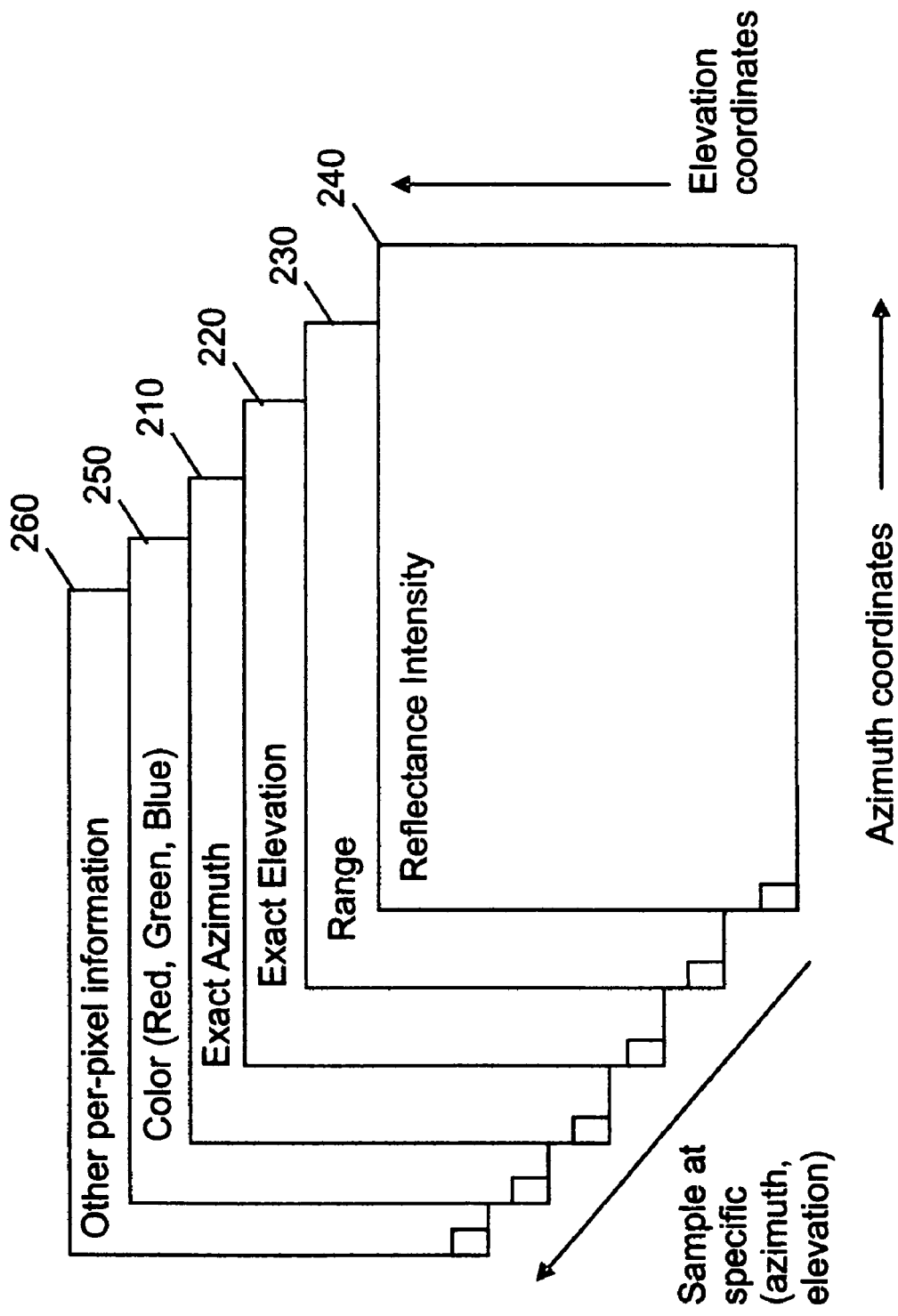
FIG. 2 is a diagram illustrating multiple example values that could be associated with a pixel within a 2D image representing a 3D range data set.
Figure 3:
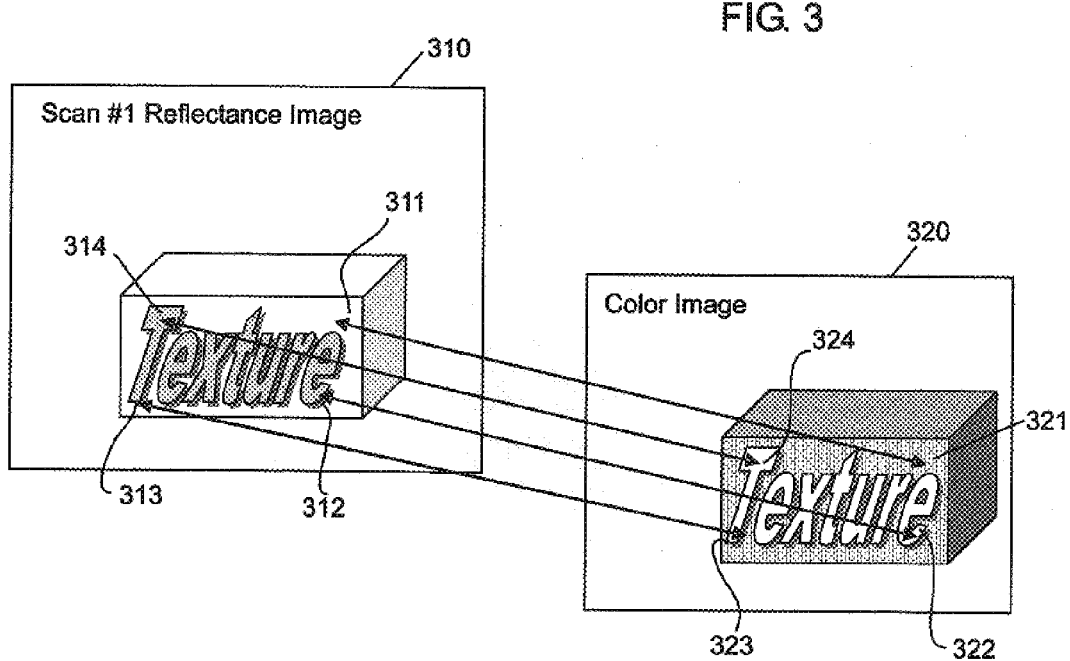
FIG. 3 is a diagram illustrating corresponding range and color information for a registered color image representing a 3D range data set.

A 2D displayed image format such as 510, 530, or 540 is one in which the 3D data set is represented as a 2D image. There are many well-known techniques for doing this since the data from a typical 3D range finder is obtained by scanning in two dimensions, typically azimuth and elevation. The resulting data can naturally be represented as a 2D image in spherical projection, where the azimuth angle of a 3D sample is represented as the horizontal or X axis and the elevation angle is represented as vertical or Y axis on the display, and each pixel represents one or more 3D data points depending on the scale chosen. The 2D displayed image need not be represented in spherical projection, but in any other well-known projection of a 3D data set to a 2D display. As illustrated in FIG. 2, each pixel may have a multiplicity of associated values stored with it, including precise azimuth angle value 210, precise elevation angle value 220, range value 230, reflectance value 240, color 250 (RGB), and any other useful values 260. The color of each pixel with in the 2D displayed image may be determined in any of a number of well-known formats. A Range Image has a false color assigned to each pixel based on its range. A Reflectance Image such as 510 or 540 has a color assigned to each pixel based on the intensity of the reflected laser beam. A Registered Color Image such as 530 has a color assigned to each pixel based on the color obtained from a color sensor such as a 2D digital camera such that the range data and color data are aligned as shown in FIG. 3.

The user specifies measurement features in images by identifying a particular pixel within a 2D or 3D displayed image which will allow the calculation of the X, Y, and Z coordinates of the data represented by that pixel. For example, the user might use a mouse or other control device to position a cursor such as a crosshairs over a desired pixel within a 2D reflectance image. Since the azimuth 210, elevation 220, and range 230 values for a 3D range sample are associated with the pixel, simple trigonometry can be used to convert from spherical to Cartesian coordinates and obtain the corresponding X, Y, and Z values. In an additional feature specification technique, the image might be zoomed in so that an image data pixel covers a 10×10 array of pixels on the screen. In that case, the cursor could be used to indicate a sub-pixel location to within 0.1 pixel and more accurate X, Y, and Z values can be readily interpolated based on the sub-pixel location and azimuth, elevation, and range values associated with neighboring pixels. In a related additional feature specification technique a point on a 3D surface might be selected with a cursor and then the X, Y, and Z values may be calculated by interpolating between the actual 3D range data points that define the surface. In another feature specification technique, the method can be extended to cover holes and data interpolated across holes. As used herein, holes are places where the 3D rangefinder did not acquire a range measurement because of insufficient returned laser energy or other reasons. An interactive or automated software tool may allow the user to estimate and specify the location of a feature point anywhere within a hole even though that particular location is not directly associated with a measured 3D range data point.

For example the user may interactively or automatically estimate and specify the location of the center of a circular hole in a 2D or 3D displayed image. Calculation of the bi-linear, bi-cubic, or other interpolation of surrounding measured range data points can then yield the estimated feature point location.

Figure 6:
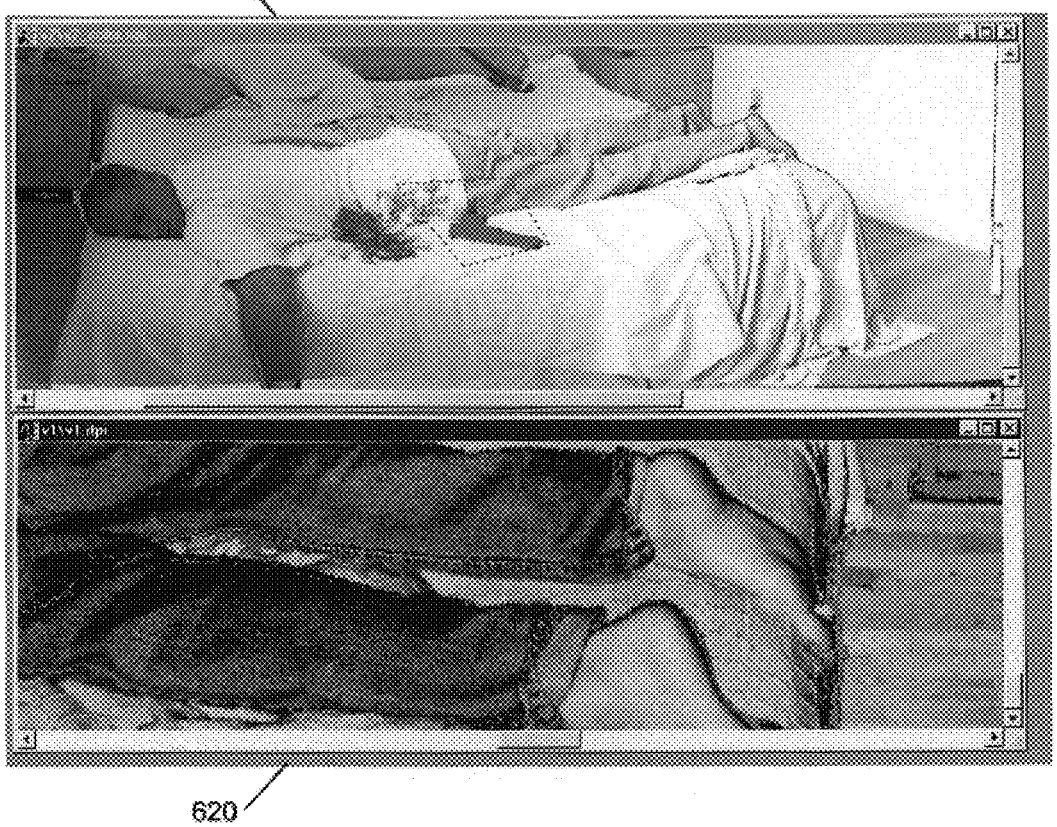
FIG. 6 is a diagram illustrating a registered color image from one 3-D data set and a reflectance image from another 3-D data set, according to some embodiments of the present invention.

The process of displaying images representing multiple data sets is illustrated in FIG. 6. In this Figure the upper window 610 is a 2D Registered Color Image representing one 3D data set acquired with a 3D rangefinder located near the head of a simulated murder victim, for example. The lower window 620 is a 2D Reflectance Image representing a different 3D data set acquired with the 3D rangefinder located near the foot of the victim.

Figure 7:
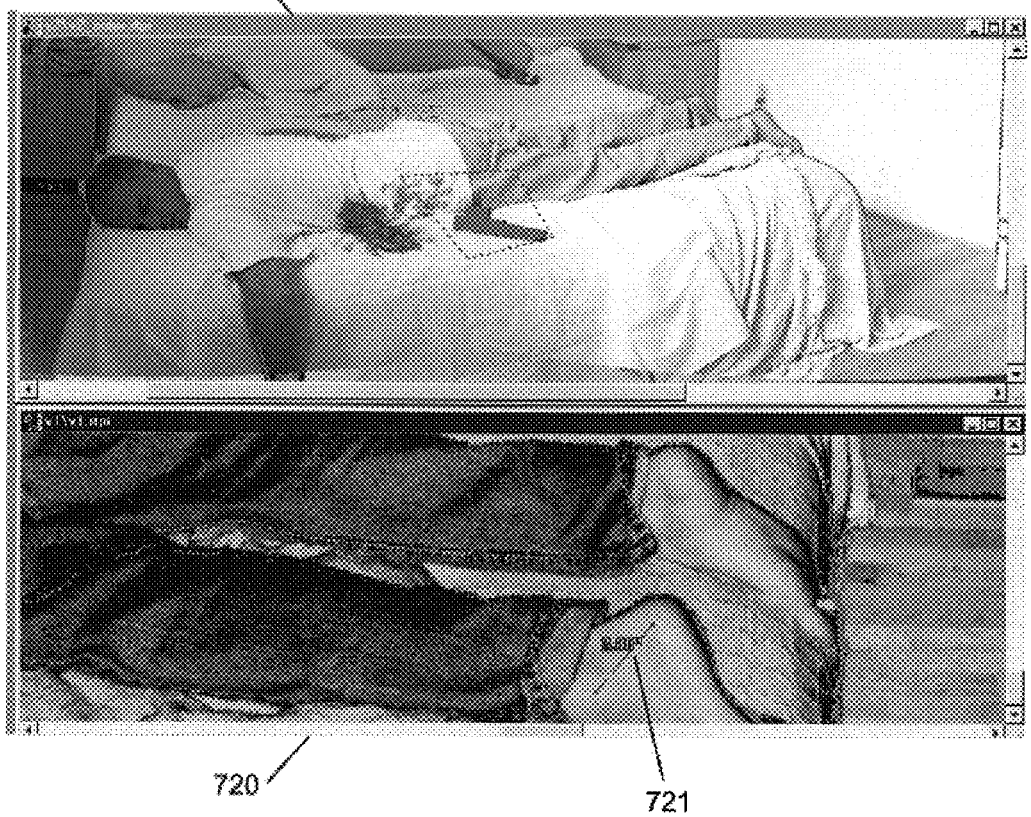
FIG. 7 is a diagram illustrating a registered color image from one 3-D data set and a reflectance image from another 3-D data set showing a measurement between two points within a single 3d data set and image thereof, according to some embodiments of the present invention.

FIG. 7 contains the same two 3D data sets as FIG. 6, represented by a 2D Registered Color Image 710 and a 2D Reflectance Image 720. FIG. 7 illustrates using conventional techniques for making and displaying measurements within a single 3D data set. These techniques have been available in DeltaSphere software since some time ago, for example. Two points have been selected in the Reflectance Image 720 and their respective X, Y, and Z coordinates have been determined from the underlying 3D data set as discussed previously. Using conventional techniques the distance between them has been calculated and a measurement line and measurement figures 721 are displayed within the Reflectance Image 720.

Figure 8:
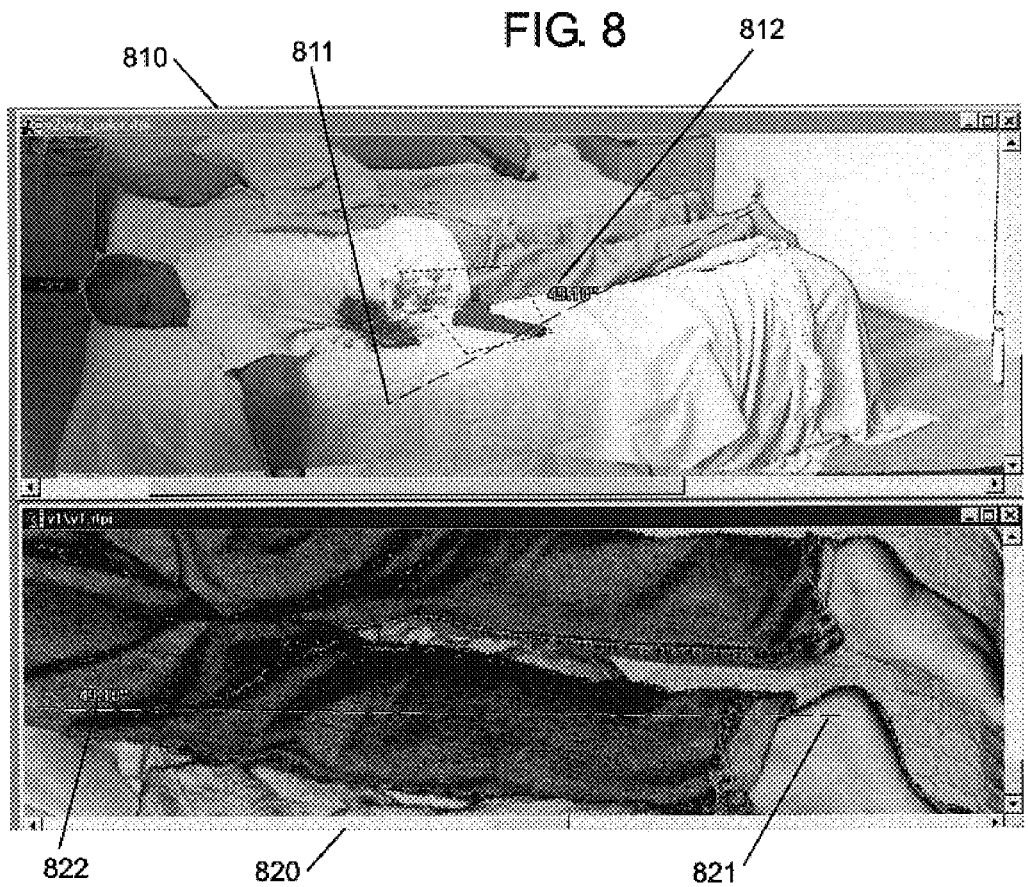
FIG. 8 is a diagram illustrating a registered color image from one 3-D data set and a reflectance image from another 3-D data set showing measurement between two points in two different 3-D data sets and images thereof, according to some embodiments of the present invention.

FIG. 8 contains the same two 3D data sets as FIG. 6, represented by a 2D Registered Color Image 810 and a 2D Reflectance Image 820. FIG. 8 illustrates one aspect of the present invention, wherein one endpoint 821 of a measurement has been selected on the victim's foot in the Reflectance Image 820 and another endpoint 811 has been selected on the bed within the Registered Color Image 810. Even though endpoint 821 is visible in both images 810 and 820, it has been specified within the image where it is most apparent and easy to select, enhancing ease-of-use and accuracy. In a further aspect of the present invention, the measurement line and measurement figures are represented in both 2D images as 812 and 822, respectively. Thus the invention allows the user to easily select measurement features within each 3D data set using display formats where the feature is most readily perceived, and furthermore provides the resulting measurement information to the user within the proper context to aid in understanding.

Figure 9:
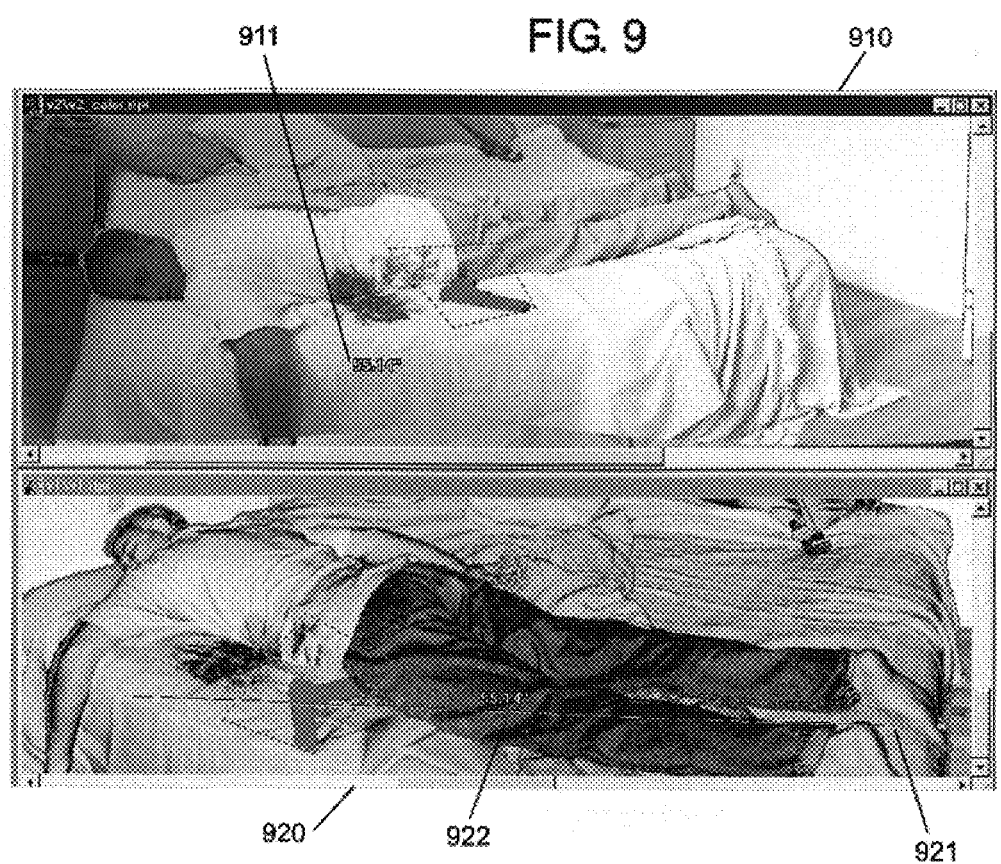
FIG. 9 is a diagram illustrating a registered color image from one 3-D data set and a reflectance image from another 3-D data set showing measurement between two points in two different 3-D data sets and images thereof, according to some embodiments of the present invention.

FIG. 9 contains the same two 3D data sets as FIG. 6, represented by a 2D Registered Color Image 910 and a 2D Reflectance Image 920. FIG. 9 illustrates another aspect of the present invention, wherein one endpoint 921 of a measurement has been selected between the victim's feet in the Reflectance Image 920 and another endpoint 911 has been selected on the bed within the Registered Color Image 910. Note that while the endpoint 911 is visible in both images 910 and 920, in this case the endpoint 921 is only visible within the Reflectance Image 920, illustrating another advantage of the present invention. The measurement line and figures 922 are shown in 2D Reflectance Image 920.

Figure 10:
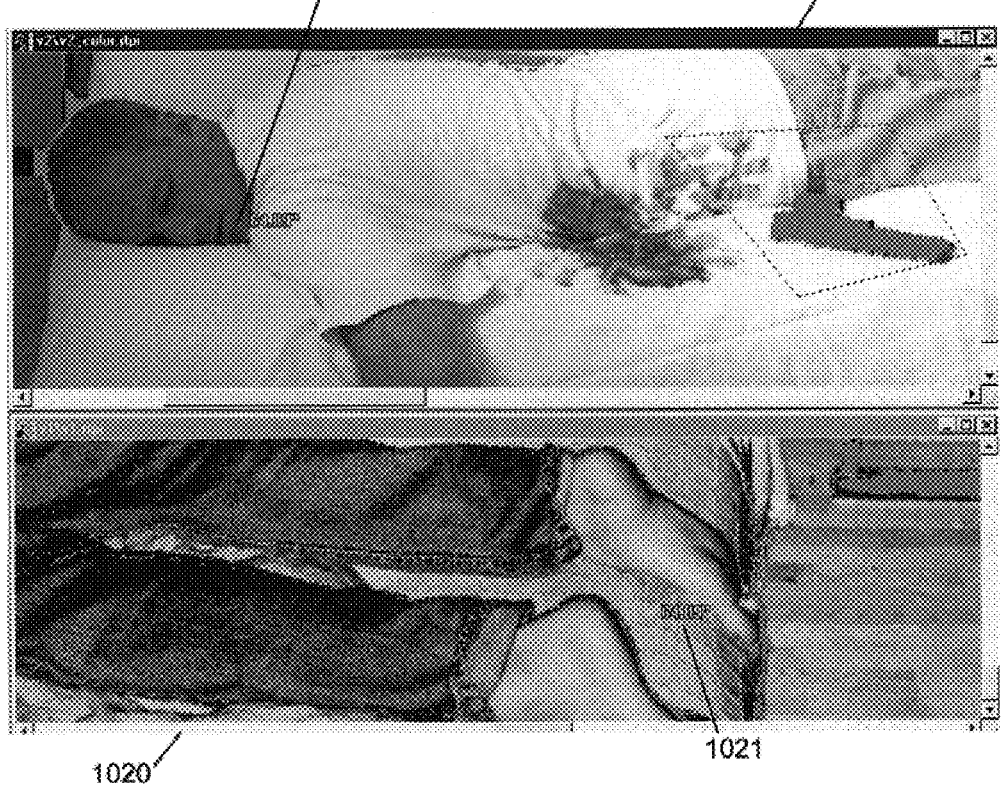
FIG. 10 is a diagram illustrating a registered color image from one 3-D data set and a reflectance image from another 3-D data set showing measurement between two points in two different 3-D data sets and images thereof, according to some embodiments of the present invention.

FIG. 10 contains the same two 3D data sets as FIG. 6, represented by a 2D Registered Color Image 1010 and a 2D Reflectance Image 1020. FIG. 10 illustrates another aspect of the present invention, wherein one endpoint 1021 of a measurement has been selected between the victim's feet in the Reflectance Image 1020 and another endpoint 1011 has been selected on the victim's chin within the Registered Color Image 1010. In this case, note that endpoint 1011 is visible only in image 1010, and the endpoint 1021 is visible only within image 1020, illustrating another advantage of the present invention.

Figure 11:
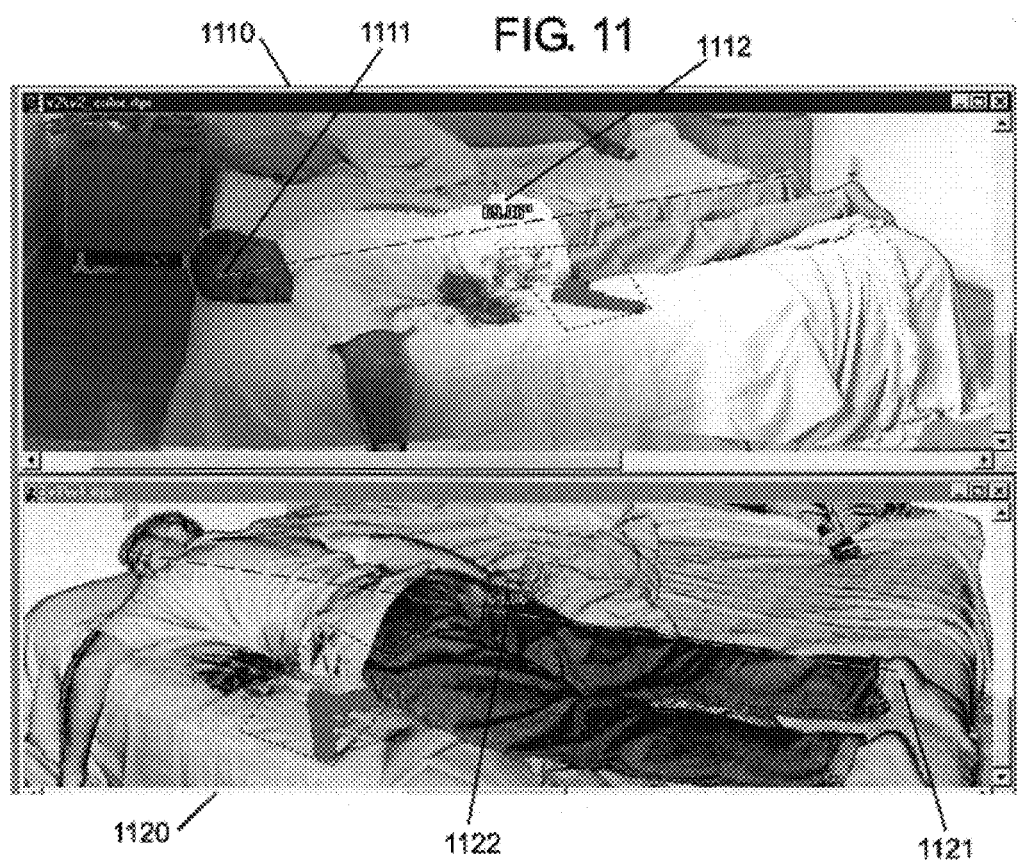
FIG. 11 is a diagram illustrating a registered color image from one 3-D data set and a reflectance image from another 3-D data set showing measurement between two points in two different 3-D data sets and images thereof, according to some embodiments of the present invention.

FIG. 11 contains the same two 3D data sets as FIG. 6, represented by a 2D Registered Color Image 1110 and a 2D Reflectance Image 1120. FIG. 11 illustrates another aspect of the present invention, wherein one endpoint 1121 of a measurement has been selected on the victim's foot in the Reflectance Image 1120 and another endpoint 1111 has been selected on the victim's forehead within the Registered Color Image 1110. The measurement line and figures 1112 and 1122 are shown in images 1110 and 1120 respectively, providing additional context and clarity to the user.

Thus it can be seen that embodiments of the present invention can address problems noted above. As such, embodiments provide an improvement upon existing methods which rely on specifying measurement features within confusing and often-ambiguous 3D point displays of multiple 3D data sets which have first been combined into a single 3D data set. The embodiments provide a natural, easy-to-use method of specifying and displaying measurements between multiple 3D range data sets that allow one to obtain a more complete and readily understood measurement of a scene or object.

Many modifications and other embodiments of the invention will come to mind to one skilled in the art to which this invention pertains having the benefit of the teachings presented in the foregoing descriptions and the associated figures. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limiting the scope of the present invention in any way

What is claimed is:

1. A method for making measurements between two 3D range data sets obtained using a 3D rangefinder device, comprising:
   providing a first 3D range data set;
   providing a second 3D range data set, wherein the second 3D range data set is a different data set from the first 3D range data set;
   computing a 3D transformation between the first 3D range data set and the second 3D range data set;
   representing the first 3D range data set as a first displayed image;
   representing the second 3D range data set as a second displayed image, wherein the second displayed image is a different image from the first displayed image;
   identifying at least a first feature within the first displayed image;
   identifying at least a second feature within the second displayed image;
   computing a measurement based on at least the first feature and the second feature utilizing the 3D transformation between the first 3D range data set and the second 3D range data set; and
   displaying the computed measurement within at least one of the first displayed image and the second displayed image.

2. The method of claim 1 wherein the computed measurement is displayed in one of the first displayed image only and the second displayed image only.

3. The method of claim 1, where displaying the computed measurement represents displaying at least one display selected from the group consisting of a measurement point display, a plurality of measurement points displayed, a measurement line display, a plurality of measurement lines displayed, a measurement surface displayed, a plurality of measurement surfaces displayed, a value displayed, a plurality of values displayed, a measurement volume displayed, a plurality of measurement volumes displayed, a measurement feature displayed, a plurality of measurement features displayed, and combinations of the preceding displays.

4. The method of claim 1, further comprising at least a third display, and wherein the computed measurement is displayed as selected from the group consisting of displayed in at least the third displayed image, displayed in the first displayed image, displayed in the second displayed image, and displayed in some combination of the preceding displayed images.

5. The method of claim 1, wherein where the second 3D range data set may be obtained from the group consisting of being obtained by the same 3D rangefinder device as the first 3D range data set but obtained from a different 3D location, being obtained by the same 3D rangefinder device as the first 3D range data set from the same 3D location but obtained at a different resolution, being obtained by the same 3D rangefinder device as the first 3D range data set from the same 3D location but obtained at a different time, being obtained by a different 3D range finder device than was used for the first 3D range data set and obtained at the same 3D location, being obtained by a different 3D range finder device than was used for the first 3D range data set and obtained from a different 3D location, and being obtained by a different 3D rangefinder device than was used for the first 3D range data set and obtained at a different time.

6. The method of claim 1, wherein at least one of the first 3D range data set and the second 3D range data set are provided by a 3D rangefinder device selected from the group consisting of a scanning laser rangefinder using time of flight range measurement principles, a scanning laser rangefinder using phase comparison range measurement principles, a scanning laser rangefinder using any other range measurement principles, an imaging laser range finder range camera using time of flight range measurement principles, an imaging laser rangefinder range camera using phase comparison range measurement principles, an imaging laser rangefinder range camera using any other range measurement principles, a triangulation rangefinder, a stereo image rangefinder, a multiple image rangefinder, any other device that acquires a multiplicity of range data points simultaneously, and any other device that acquires a multiplicity of range data points over a period of time and combinations of the above.

7. The method of claim 1, wherein at least one of the first displayed image and the second displayed image comprises a 2D image selected from the group consisting of a 2D range image comprising range values from the 3D rangefinder device converted to monochrome, a 2D range image comprising range values from the 3D rangefinder device converted to false color, a 2D reflectance image comprising intensity values of the rangefinding signal reflected from a physical surface and thereafter received by the 3D rangefinder device converted to monochrome, a 2D reflectance image comprising intensity values of the range finding signal reflected from a physical surface and thereafter received by the 3D rangefinder device converted to false color, a 2D registered color image comprising a color camera image previously registered with 3D range data, a 2D registered color image wherein the image is acquired from the same perspective as the 3D range data set, a 2D registered color image wherein the image is acquired from a different perspective than the 3D range data set, a 2D registered color image wherein the image is acquired with the same resolution as the 3D range data set, a 2D registered color image wherein the image is acquired with different resolution from the 3D range data set, a 2D image displayed in spherical projection format, a 2D image displayed in any other 3D-to-2D projection format, and a 2D registered monochrome image comprising a monochrome camera image previously registered with 3D range data.

8. The method of claim 1, wherein at least one of the first displayed image and the second displayed image comprises a 3D image selected from the group consisting of a 3D point display, a 3D point display in orthogonal projection, a 3D point display in perspective projection, a 3D polygonal mesh display, a 3D polygonal mesh in orthogonal projection display, a 3D polygonal mesh in perspective projection display, a 3D surface geometry display, a 3D surface geometry display in orthogonal projection, and a 3D surface geometry display in perspective projection.

9. The method of claim 1, implemented in a computer processor executing a suitable computer software program product therein.

10. The method of claim 1, implemented in a suitable computer software program product embodied on computer readable tangible media.

11. The method of claim 1, wherein identifying at least one of the first feature and the second feature comprises using a facility selected from the group consisting of using a computer cursor controlled by a mouse to identify, using a computer cursor controlled by a pointing stick to identify, using a computer cursor controlled by a joystick to identify, using a computer cursor controlled by a touch pad to identify, using software to identify, and combinations of the above to identify.

12. The method of claim 1, wherein at least one 3D range data set is represented by at least two displayed images.

13. The method of claim 1, wherein at least three 3D range data sets are provided and wherein the respective features are identified within the respective displayed images.

14. The method of claim 13, wherein the measurement is computed using computing selected from the group consisting of computing the measurement between at least two 3D range data sets in parallel, computing the measurement between at least two 3D range data sets simultaneously, computing the measurement between at least two 3D range data sets serially, and combinations of the preceding.

15. The method of claim 1, wherein at least part of identifying a feature is made automatically including at least one operation selected from the group consisting of orienting a measurement perpendicularly from a specified surface, placing a feature restricted to a specified surface, placing a feature in the center of a circular feature, and combinations of the preceding ways of identifying.

16. The method of claim 1, wherein specifying corresponding features comprises at least one technique selected from the group consisting of using sub-pixel interpolation in any displayed image wherein a software tool may allow the user to estimate and specify the location of a feature anywhere within a pixel and not just at its origin, using interpolation between measured 3D range data points on surfaces in any 3D displayed image wherein a software tool may allow the user to estimate and specify the location of a feature anywhere upon a surface even if that particular location is not directly associated with a measured 3D range data point, using estimates of the centers of features wherein the user may estimate and specify the location of the center of a feature even if the particular pixel at that chosen center appears no different from adjacent pixels, and using holes and data interpolated across holes wherein the rangefinder device did not acquire a range measurement and wherein a software tool may allow the user to estimate and specify the location of a feature anywhere within a hole even though that particular location is not directly associated with a measured 3D range data point.

17. A computer program product stored in computer readable media for execution in at least one processor for making measurements between two 3D range data sets obtained using a 3D rangefinder device, comprising:
- a first software module for providing a first 3D range data set;
- a second software module for providing a second 3D range data set, wherein the second 3D range data set is a different data set from the first 3D range data set;
- a third software module for computing a 3D transformation between the first 3D range data set and the second 3D range data sets;
- a fourth software module for representing the first 3D range data set as a first displayed image;
- a fifth software module for representing the second 3D range data set as a second displayed image, wherein the second displayed image is a different image from the first displayed image;
- a sixth software module for identifying at least a first feature within the first displayed image;
- a seventh software module for identifying at least a second feature within the second displayed image;
- an eighth software module for computing a measurement based on at least the first feature and the second feature utilizing the 3D transformation between the first 3D range set and the second 3D range data set; and
- a ninth software module for displaying the computed measurement within at least one of the first displayed image and the second displayed image.

18. The computer program product of claim 17, wherein the computed measurement of the eighth software module is displayed as selected from the group consisting of displayed in at least a third displayed image, displayed in the first displayed image, displayed in the second displayed image, and displayed in some combination of the preceding displays.

19. The computer program product of claim 17, wherein at least one of the first 3D range data set and the second 3D range data set are provided by a 3D rangefinder device selected from the group consisting of a scanning laser rangefinder using time of flight range measurement principles, a scanning laser rangefinder using phase comparison range measurement principles, a scanning laser rangefinder using any other range measurement principles, an imaging laser rangefinder range camera using time of flight range measurement principles, an imaging laser rangefinder range camera using phase comparison range measurement principles, an imaging laser rangefinder range camera using any other range measurement principles, a triangulation rangefinder, a stereo image rangefinder, a multiple image rangefinder, any other device that acquires a multiplicity of range data points simultaneously, and any other device that acquires a multiplicity of range data points over a period of time and combinations of the above.

20. The computer program product of claim 17, wherein at least three 3D range data sets are provided and wherein the respective features are identified within the respective displayed images.

21. An apparatus for making measurements between two 3D range data sets obtained using a 3D rangefinder device, comprising:
- at least one computer processor;
- a computer program product executing within the at least one computer processor, wherein the computer program product further comprises at least the following software modules therein;
  - a first software module for providing a first 3D range data set;
  - a second software module for providing a second 3D range data set, wherein the second 3D range data set is a different data set from the first 3D range data set;
  - a third software module for computing a 3D transformation between the first 3D range data set and the second 3D range data sets;
  - a fourth software module for representing the first 3D range data set as a first displayed image;
  - a fifth software module for representing the second 3D range data set as a second displayed image, wherein the second displayed image is a different image from the first displayed image;
  - a sixth software module for identifying at least a first feature within the first displayed image;
  - a seventh software module for identifying at least a second feature within the second displayed image;
  - an eighth software module for computing a measurement based on at least the first feature and the second feature utilizing the 3D transformation between the first 3D range set and the second 3D range data set; and
  - a ninth software module for displaying the computed measurement within at least one of the first displayed image and the second displayed image.

22. The apparatus of claim 21, wherein the computed measurement of the eighth software module is displayed as selected from the group consisting of displayed in at least a third displayed image, displayed in the first displayed image, displayed in the second displayed image, and displayed in some combination of the preceding displays.

23. The apparatus of claim 21, wherein at least one of the first 3D range data set and the second 3D range data set are provided by a 3D rangefinder device selected from the group consisting of a scanning laser rangefinder using time of flight range measurement principles, a scanning laser rangefinder using phase comparison range measurement principles, a scanning laser rangefinder using any other range measurement principles, an imaging laser rangefinder range camera using time of flight range measurement principles, an imaging laser rangefinder range camera using phase comparison range measurement principles, an imaging laser rangefinder range camera using any other range measurement principles, a triangulation rangefinder, a stereo image rangefinder, a multiple image rangefinder, any other device that acquires a multiplicity of range data points simultaneously, and any other device that acquires a multiplicity of range data points over a period of time and combinations of the above.

24. The apparatus of claim 21, wherein at least three 3D range data sets are provided and wherein the respective features are identified within the respective displayed images.

* * * * *